W. SPRAGUE.
HARVESTER.
No. 79,871.  Patented July 14, 1868.
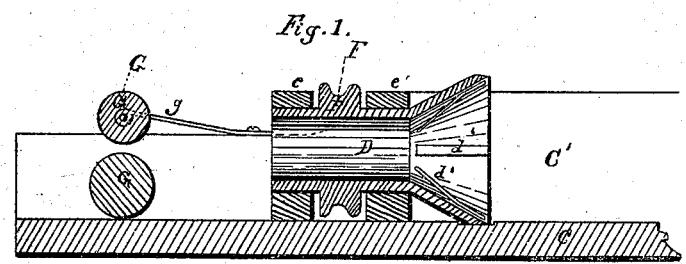
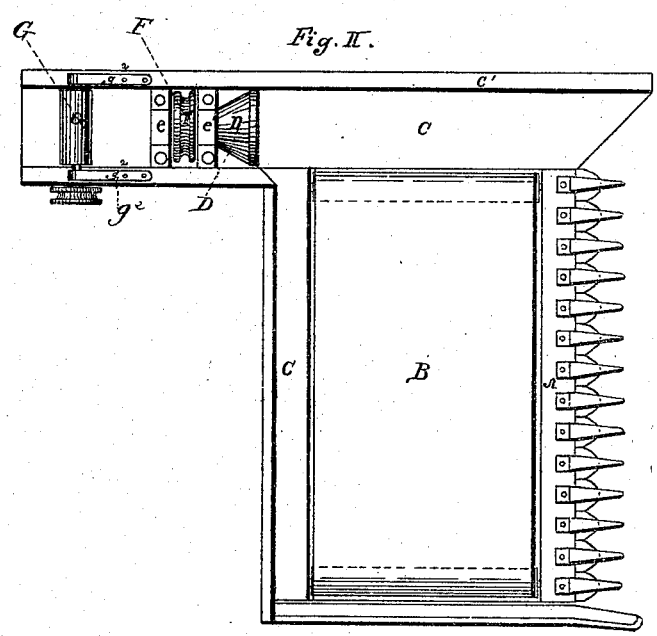

United States Patent Office.

WELCOME SPRAGUE, OF FARNHAM, NEW YORK, ASSIGNOR TO HIMSELF AND BERNARD H. MUEHLE.

Letters Patent No. 79,871, dated July 14, 1868; antedated June 30, 1868.

IMPROVEMENT IN HARVESTERS.

*The Schedule referred to in these Letters Patent and making part of the same.*

TO ALL WHOM IT MAY CONCERN:

Be it known that I, WELCOME SPRAGUE, of Farnham, in the county of Erie, and State of New York, (assignor to myself and Bernard H. Muehle, of the city of Buffalo, county and State aforesaid,) have invented certain new and useful Improvements in Harvesting Grain; and I do hereby declare that the following is a full and exact description thereof, reference being had to the accompanying drawings, making a part of this specification, in which—

Figure I is a vertical longitudinal section of my improvement.

Figure II is a top plan view.

The nature of this invention consists in so constructing a reaping-machine that the grain, after it is cut by the knives, will be twisted or braided into the shape of a continuous rope, and in that condition be left upon the ground.

In the accompanying drawings, letters of like name and kind refer to like parts in each of the figures.

A represents the finger-bar of a reaping-machine, of common and well-known construction, and B an endless apron, supported upon two rollers, having bearings upon the frame C.

The rollers are revolved, by means of suitable gearing, in such manner that the upper half of said apron has a steady and slow movement towards the main frame of the machine, which is not deemed necessary to be represented in the drawings, because it may be of any common and well-known construction.

The grain, as it is cut by the knives, falls upon this apron, and is thereby conveyed sidewise, or at right angles to the line of motion of the machine, and heaped up or collected against the side-board $c'$, erected upon that side of the frame C.

D represents a device for twisting the grain so collected into a rope.

It consists of a tube, of a diameter sufficiently large for the passage through it of the rope to be formed, having a flaring or conical mouth or opening upon one end, for the purpose of guiding or drawing the grain into the tube.

One, two, three, or more, springs, $d'$, are secured to the flaring rim of said tube, which springs extend radially into the tube, and are slightly curved towards the centre thereof. The tube D is supported in suitable bearings, $e\ e'$, and provided with a sheave, pulley, or cog-wheel, F, by means of which motion may be communicated to the tube from the main driving-gear of the machine.

G G' are two horizontal rollers, one above the other, between which the grain passes after it is twisted into the shape of a rope. The upper roller, G, is supported upon springs, $g^2$, or by any equivalent device, which cause the upper roller to press upon the lower one sufficient to prevent the grain from untwisting upon being discharged from the tube D. The shaft of the lower roller projects upon one side, and carries a sheave or cog-wheel, by which the required revolution may be given the rollers, for the purpose of paying out the grain rope as fast as it is formed. The speed with which the tube D and rollers G G' revolve should be within the control of the driver, who may regulate the same as circumstances may require.

My invention is intended to save manual labor in harvesting grain, and its advantages in that respect may be briefly described as follows:

The reaping-machine and the threshing-machine are now the principal labor-saving machines used for harvesting grain and preparing it for the market. Their value cannot be estimated too highly.

But, for operating them, and for handling the grain in conjunction with their operation, still a great deal of manual labor and animal power is needed, which can be entirely dispensed with, if grain is harvested according to the intent and purpose of my invention.

A device for twisting the grain into a rope after it has been cut, substantially as herein described, may be attached to almost any reaping-machine now in common use, no matter what the principle of its construction may be.

This device will be automatic, and, instead of leaving the cut grain in windrows or heaps upon the ground, it will form a rope twisted sufficiently tight to bear and sustain its own weight. This grain rope will be left lying in the track of the reaping-machine, and, being supported upon the top of the stubble, will dry in that shape as well as, or probably better than, in any other.

When the grain is ready for threshing, the rope may be wound around a reel, and thus transported to the place where the threshing-machine is located; or, a small and cheap two-horse threshing-machine may be driven in the track of the reaper, picking up the rope of grain, feeding it automatically into itself, and threshing the grain as fast as it was cut by the reaper, the grain being discharged into a suitable receptacle upon the machine, and the straw either distributed broadcast over the field, or piled up in heaps, as may be desired; hence, the immense labor of binding, stacking, loading, and transporting upon wagons, and unloading, as well as feeding the grain to the threshing-machine, is effectually avoided, and may be entirely dispensed with by the use of my improvement.

As the reaper has superseded the sickle, and the threshing-machine the flail, so is this invention intended to supersede the pitch-fork, when used in harvesting grain.

It will be readily seen and understood, from the foregoing, that the above-described device for twisting grain into a rope (though it is admirably adapted to the purpose) may be modified and improved in various ways; and I am about to make practical experiments for the purpose of perfecting the same, and intend to make separate and distinct applications for Letters Patent for each and every improvement which I have made, or may hereafter make, in the said apparatus.

Hence, for the purpose of this application, I shall not confine myself to the particular and specific construction of the said device for twisting the grain; but

What I claim as my invention, and desire to secure by Letters Patent, is—

So constructing a reaping-machine that the grain, after it is cut by the knives or cutters, will be collected and formed into a rope, or equivalent, and in that shape be left, in the rear of the machine, upon the ground.

Dated, August 29, 1867.

WELCOME SPRAGUE.

Witnesses:
  EDW. WILHELM,
  TRUMAN C. WHITE.